US008060571B2

(12) United States Patent
Rao

(10) Patent No.: US 8,060,571 B2
(45) Date of Patent: Nov. 15, 2011

(54) SHARING OF AUDIO/VISUAL CONTENT WITH A SELECTED USER

(75) Inventor: Padmanabha R. Rao, Palo Alto, CA (US)

(73) Assignee: Sling Media, Inc., Foster City, CA (US)

( * ) Notice: Subject to any disclaimer, the term of this patent is extended or adjusted under 35 U.S.C. 154(b) by 323 days.

(21) Appl. No.: 12/424,249

(22) Filed: Apr. 15, 2009

(65) Prior Publication Data

US 2010/0268779 A1 Oct. 21, 2010

(51) Int. Cl.
*G06F 15/16* (2006.01)
*G06F 7/04* (2006.01)
*H04N 7/20* (2006.01)
*H04N 7/173* (2006.01)
*H04N 7/16* (2006.01)
*H04N 5/44* (2006.01)

(52) U.S. Cl. ............ 709/206; 709/217; 725/63; 725/86; 725/143; 348/553; 726/28

(58) Field of Classification Search .................. 709/206, 709/217; 725/63, 86; 726/143; 348/553
See application file for complete search history.

(56) References Cited

U.S. PATENT DOCUMENTS

| | | | |
|---|---|---|---|
| 7,783,703 B2 * | 8/2010 | Rafey et al. ................... 709/204 |
| 2006/0095471 A1 * | 5/2006 | Krikorian et al. .......... 707/104.1 |
| 2006/0184989 A1 * | 8/2006 | Slothouber ................... 725/110 |
| 2007/0124779 A1 * | 5/2007 | Casey et al. ..................... 725/87 |
| 2007/0168543 A1 | 7/2007 | Krikorian et al. |
| 2007/0198532 A1 | 8/2007 | Krikorian et al. |
| 2007/0204311 A1 * | 8/2007 | Hasek et al. ..................... 725/91 |
| 2008/0059533 A1 | 3/2008 | Krikorian |
| 2009/0019480 A1 | 1/2009 | White |
| 2010/0269146 A1 * | 10/2010 | Britt ............................. 725/110 |

FOREIGN PATENT DOCUMENTS

WO 2005122025 A2 12/2005

OTHER PUBLICATIONS

"SlingGuide for DISH DVR", retrieved from internet: http://www.sliIngmedia.com/go/slingguide on Apr. 5, 2009, 1 page.
"I just got SlingPlayer Mobile for BlackBerry. How do I get a Sling Account?", retrieved from internet: http://support.slingmedia.com/get/KB-005854.html on Apr. 5, 2009, 1 page.

(Continued)

*Primary Examiner* — Ranodhi Serrao
(74) *Attorney, Agent, or Firm* — Ingrassia Fisher & Lorenz, P.C.

(57) ABSTRACT

A method of sharing audio/visual content is presented. In the method, the audio/visual content is received from an audio/visual content source at an audio/visual content receiver by way of a content channel selection resource of the receiver, and stored therein. A message is transmitted from the receiver to a communication node, wherein the message indicates that the audio/visual content is available for viewing by a selected user. The communication node notifies the selected user of the message by way of a communication device associated with the selected user. In response to receiving a request for the audio/visual content from the communication device, the communication node facilitates a communication connection between the receiver and the communication device. The audio/visual content is transmitted from the receiver to the communication device over the communication connection. At the communication device, the audio/visual content is then presented to the selected user.

19 Claims, 7 Drawing Sheets

OTHER PUBLICATIONS

"Watching TV", retrieved from internet: http://inhelpus.slingmedica.com/ on Apr. 5, 2009, 1 page.

"VIP922", retrieved from internet: http://vip922.com/index.php on Apr. 5, 2009, 1 page.

"SlingMedia Announces Clip and Sling", retrieved from internet: http://us.slingmedia.com/object/io1168395718976.html on Apr. 13, 2009, 1 page.

Share it deliverable: Description of example applications, http://www.extra.research.philips.com/euprojects/share_it/deliverables/share-it-nob-31nov02-d3v10-final.pdf, Aug. 16, 2004, pp. 19, 22, 52-53, 57-59.

Notification of Transmittal of the International Search Report and the Written Opinion of the International Searching Authority, or the Declaration, from the European Patent Office, dated Aug. 18, 2010.

* cited by examiner

SHARING OF AUDIO/VISUAL CONTENT WITH A SELECTED USER

BACKGROUND

A popular and effective way of accessing television programming is via a satellite or cable television broadcast receiver or "set-top box" designed to receive television video and audio data from an orbiting satellite or a cable television headend. By employing such a set-top box, a subscriber to a satellite or cable television service provider may receive any of several hundred programming channels providing news, sports, entertainment, and the like for live program viewing. In addition, the set-top box may include a digital video recorder (DVR) for recording programs for subsequent playback at a time more convenient for the subscriber. A DVR often incorporates a magnetic disk drive or similar data storage technology for storing the recorded programs.

To provide the subscriber more remote access to live or recorded programming received by the subscriber's set-top box, Sling Media, Inc. has developed a number of products, such as the Slingbox™, which allow the subscriber to stream programming from the set-top box over an Internet connection to a remote communication/display device, such as a computer, mobile phone, or the like, in the possession of the subscriber. To further enhance this capability, some set-top boxes are being developed which include the functionality of a Slingbox™ to allow the subscriber to retrieve programming directly from the subscriber's set-top box over the Internet.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
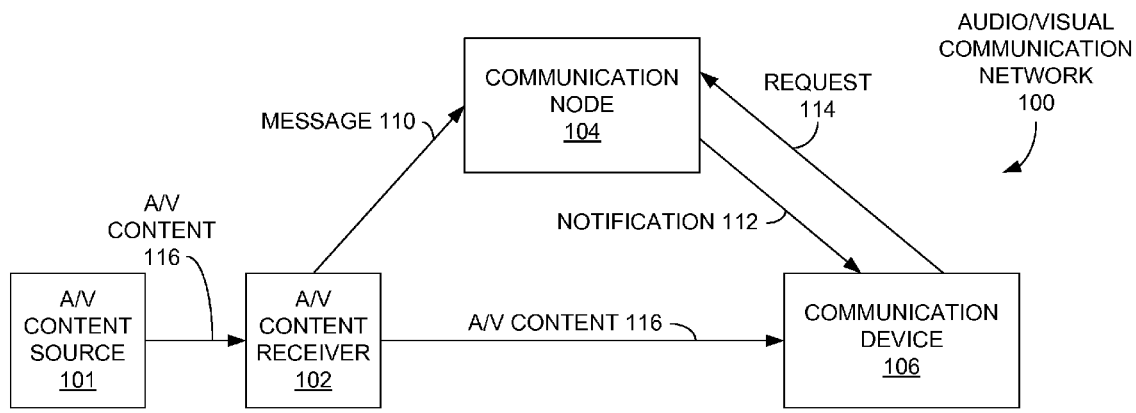
FIG. 1 is a simplified block diagram of an audio/visual communication network according to an embodiment of the invention.

FIG. 1 is a simplified block diagram of an audio/visual communication network 100 according to an embodiment of the invention. The video communication network 100 includes an audio/visual content source 101, an audio/visual content receiver 102, a communication node 104, and a communication device 106. The audio/visual communication network 100 may represent a portion of a satellite television broadcast network, a cable television broadcast network, a computer network (such as the Internet), or any other wired or wireless communication network capable of transmitting and receiving audio/visual content.

While FIG. 1 only depicts the content source 101, the receiver 102, the communication node 104, and the communication device 106, other communication devices, such as routers, repeaters, splitters, and other communication circuitry, may help form the various communication paths illustrated between the components 101-106. For example, between each of the receiver 102, the communication node 104, and the communication device 106 may be portions of an Internet Protocol (IP) network, such as the Internet or another wide-area network (WAN). Further, in the case of a satellite television network, the communication path from the audio/visual content source 101 to the audio/visual content receiver 102 may include an orbiting satellite employing a number of transponders for receiving data from the audio/visual content source 101 and relaying that data to the audio/visual content receiver 102, as well as other video content receivers not depicted in FIG. 1.

Figure 2:
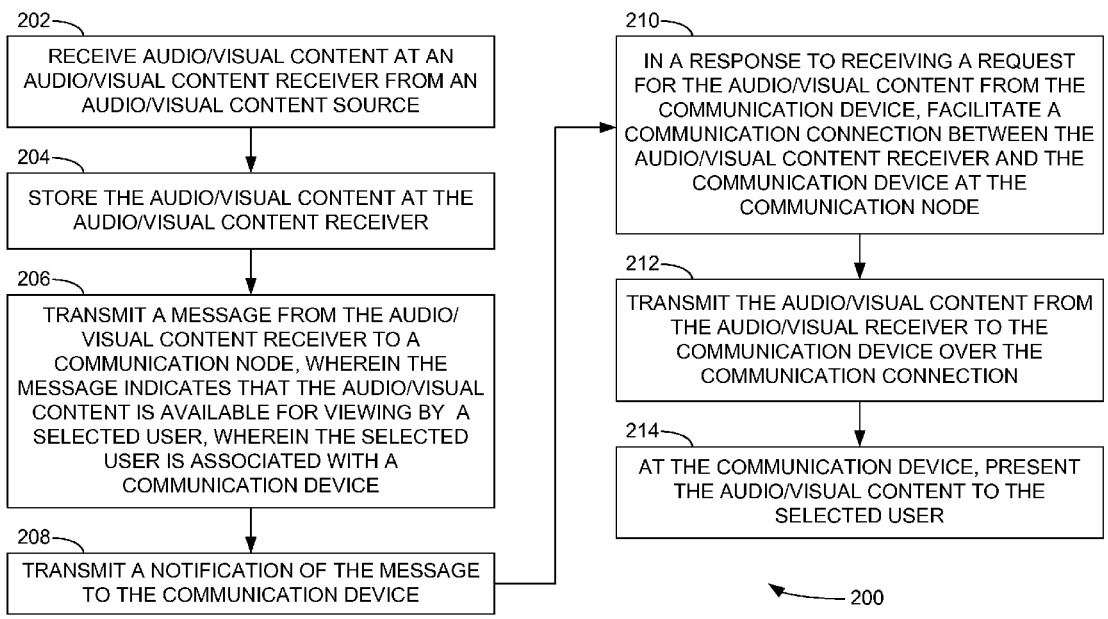
FIG. 2 is a flow diagram of a method according to an embodiment of sharing audio/visual content in the audio/visual communication network of FIG. 1.

FIG. 2 presents a flow diagram of a method 200 of sharing audio/visual content in the audio/visual communication network 100 of FIG. 1 according to an embodiment of the invention. However, other audio/visual communication systems other than the specific system 100 of FIG. 1 may employ the method 200 of FIG. 2 to similar effect.

In the method 200, the audio/visual content receiver 102 receives audio/visual content 116 from the audio/visual content source 101 (operation 202). In one implementation, the audio/visual content 116 is audio and/or video data, such as a radio or television program. Such a program may be, but is not limited to, a movie, sporting event, weekly series episode, news program, or any other type of audio/video program or portion thereof. Further, the receiver 102 receives the content 116 by way of a content channel selection resource, such as a tuner (not shown in FIG. 1). The receiver 102 stores the content 116 (operation 204). A message 110 is transmitted from the receiver 102 to the communication node 104 (operation 206). The message indicates that the audio/visual content 116 is available for viewing by a selected user, wherein the selected user is associated with the communication device 106. The communication node 104 sends a notification 112 of the message 110 to the communication device 106 associated with the selected user (operation 208). After receiving a request 114 for the audio/visual content 116 from the communication device 106, the communication node 104 facilitates a communication connection between the receiver 102 and the communication device 106 (operation 210). The content 116 is then transmitted from the receiver 102 to the communication device 106 over the connection (operation 212). The communication device 106 presents the audio/visual content 116 to the selected user (operation 214).

While the operations of FIG. 2 are depicted as being executed in a specific serial fashion, other orders of execution, including concurrent execution of two or more operations, are also possible. In another embodiment, a computer-readable storage medium may have encoded thereon instructions for a processor or other control circuitry to direct various components 102-106 of FIG. 1 to implement the method 200.

As a result of the method 200, the receiver 102, by way of the communication node 104, may share the audio/visual content 116 stored in the receiver 102 with other communication devices 106 operated by one or more users specifically selected by a user of the receiver 102 when the content 116 becomes available. Other advantages may be recognized from the various implementations of the invention discussed in greater detail below.

Figure 3:
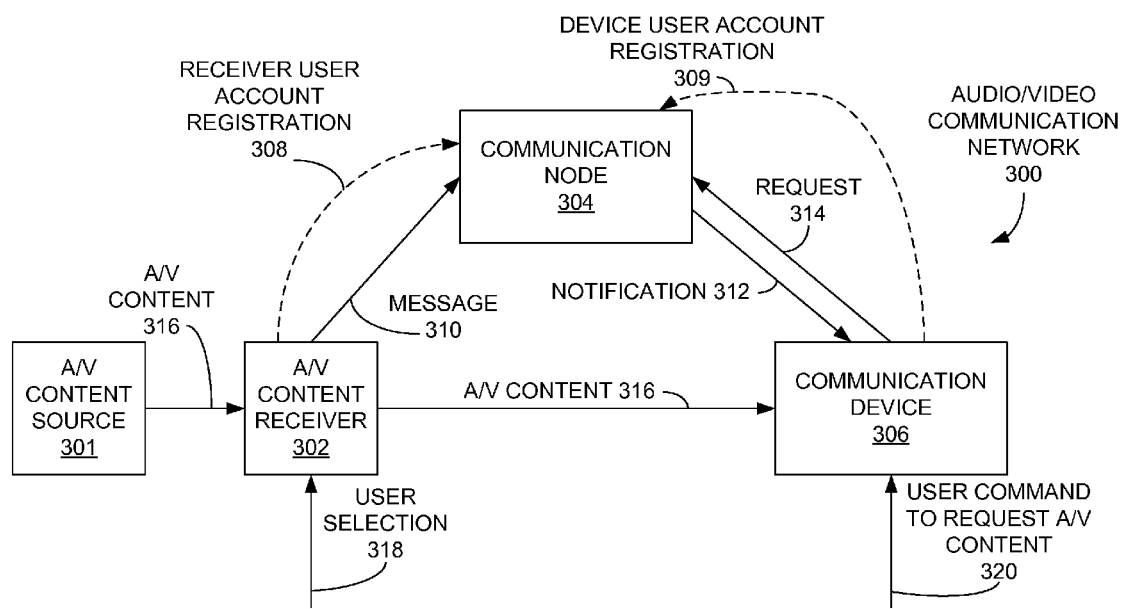
FIG. 3 is a block diagram of an audio/video communication network according to an embodiment of the invention.

FIG. 3 is a block diagram of an audio/visual communication network 300 according to another embodiment of the invention. The network 300 includes an audio/video content source 301, an audio/video content receiver 302, a communication node 304, and a communication device 306. As with the video communication network 100 of FIG. 1, the network 300 of FIG. 3 may form part of a satellite or cable television broadcast network, or any other type of communication network capable of transmitting audio and/or video data from the content source 301 to the receiver 302. Further, while only one content source 301 and receiver 302 are shown, other implementations may employ multiple content sources 301, receivers 302, communication nodes 304, and communication devices 306 within the network 300.

The audio/video content source 301 is configured to deliver audio/video content 316 to the audio/video content receiver 302. In the environment of a satellite broadcast television network, the audio/video content source 301 may be a satellite uplink center that transmits multiple channels of programming by way of transponders aboard one or more orbiting satellites in geosynchronous orbit. In another example in which the communication network 300 is a cable broadcast television network, the content source 301 may be a cable headend system. In yet another embodiment, the content source 301 may be a television station transmitting television signals by way of a terrestrial television transmitter. Other networks, such as wide-area and local-area computer networks, may incorporate an analogous content source 301 in other implementations.

Figure 4:
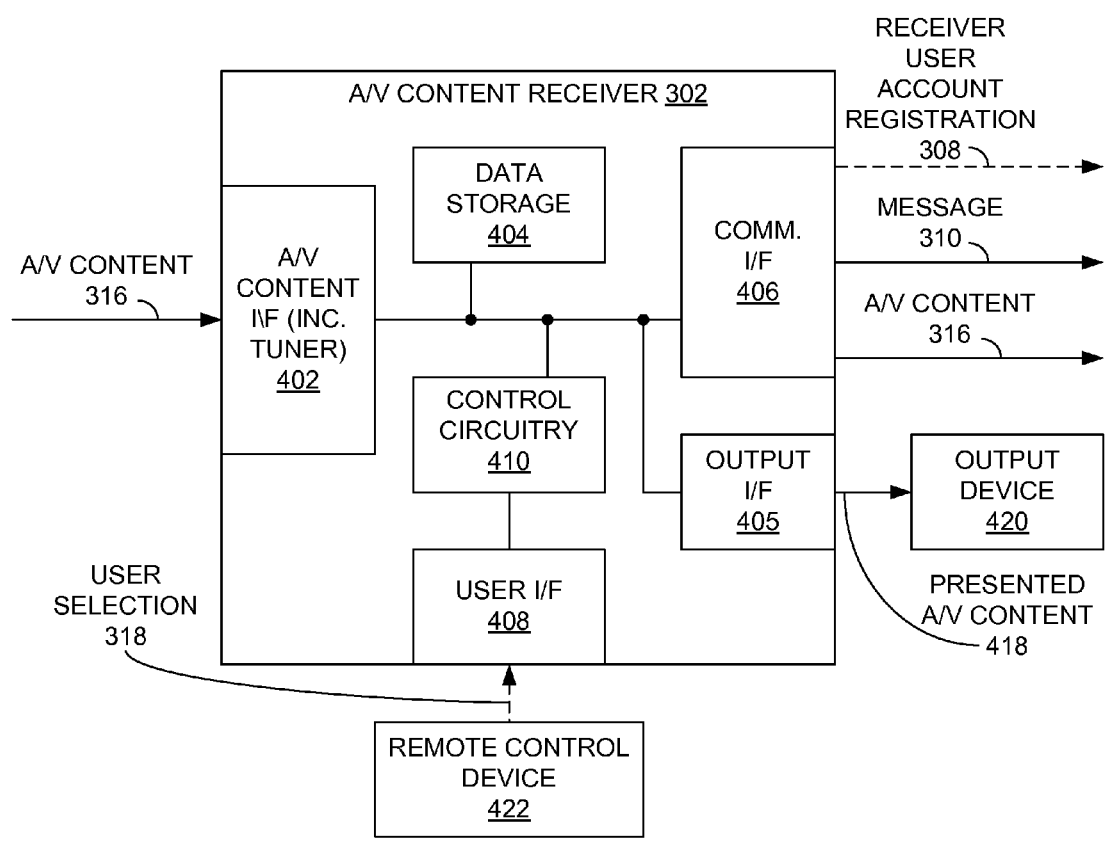
FIG. 4 is a block diagram of an audio/video content receiver of FIG. 3 according to an embodiment of the invention.

The audio/video content receiver 302 is configured to receive the audio/video content 316 from the content source 301 and store the content 316. FIG. 4 presents a block diagram of the receiver 302 according to one example. Examples of the receiver 302 may include cable, satellite, or terrestrial television set-top boxes, digital video recorders (DVRs), and the like. The receiver 302 in this case includes an audio/video content interface 402, data storage 404, an output interface 405, a communication interface 406, a user interface 408, and control circuitry 410. The audio/video content interface 402 is configured to receive the audio/video content 316 from the audio/video content source 301. In one embodiment, the audio/video content interface 402 receives the content 316 and converts the content 316 to a form more usable for processing within the audio/video content receiver 302. Such conversion may include frequency down-conversion, amplification, reformatting, and other functions. In the case of a satellite audio/video communication network 300, the audio/video content interface 402 may be coupled with or include a hyperboloid antenna combined with a low-noise block-converter/feedhorn (LNBF), which collects and amplifies the incoming signals carrying the content 316, and down-converts the signals from microwave frequencies to intermediate frequencies. As presented in FIG. 4, the audio/video content interface 402 also includes at least one content channel selection resource, such as a tuner or similar circuitry, for selecting one or more audio/video programming channels being transmitted from the satellite, descrambler circuitry for descrambling the content 316, and other circuitry. Also, the audio/video content may be a program from a broadcast channel or network, a video-on-demand (VOD) program, a pay-per-view (PPV) event, or another type of program. In another embodiment, the content channel selection resource may receive the content 316 by way of a computer network connection, such as an Internet Protocol (IP) connection carrying one or more logical channels of audio/video content.

The resulting content 316 is then forwarded to the data storage 404 of the receiver 302 for recording thereon. The data storage 404, under the direction of the control circuitry 410, provides DVR functionality for the audio/video content receiver 302. The data storage 404 may be include any type of data storage medium, including solid state memory, such as static and/or dynamic random access memory (RAM) or flash memory; and direct access memory, such as magnetic and optical disk drives.

The output interface 405 is configured to decode and/or convert the audio/video content 316 stored in the data storage 404 and deliver the content 316, or portions thereof, as presented audio/video content 418 to an output or display device 420, such as a television, video monitor, audio receiver, or the like, for presentation to the subscriber. For example, the video portion of the presented audio/video content 418 may be delivered by way of a modulated video cable connection, a composite or component video RCA-style (Radio Corporation of America) connection, and a Digital Video Interface (DVI) or High-Definition Multimedia Interface (HDMI) connection. The audio portion may be transported over a monaural or stereo audio RCA-style connection, or over an HDMI connection. Other audio/video formats and related connections may be employed in other embodiments.

The communication interface 406 is configured to communicate with both the communication node 304 and the communication device 306 of FIG. 3 by way of a communication network, such as the Internet or another wide-area network (WAN), or a local-area network (LAN). The communication interface 406 may support communication over other forms of wired or wireless communication networks in other examples. The communication interface 406 includes any hardware and/or software, such as a network interface card or similar component and associated software, necessary to provide the communications over the chosen network.

The user interface 408 is configured to receiving user commands and other input, such as a user selection 318 discussed below. The user interface 408 may provide either or both of a control panel connection located directly on a surface of the receiver 302, and a remote control interface. The remote control interface may receive commands from a remote control device 422 by way of commands transmitted over a radio frequency (RF) or infrared (IR) frequency band. Different communication methods, such as those employing optical or acoustic transmission of remote commands, may be used in other implementations.

The control circuitry 410 is configured to control and interact with the audio/video content interface 402, the data storage 404, the output interface 405, the communication interface 406, and the user interface 408, based in part upon the commands and other input received by way of the user interface 408 to render the audio/video content 316 stored in the data storage 404 available to a selected remote user. The control circuitry 410 may include one or more processors, such as a microprocessor, microcontroller, or digital signal processor (DSP), configured to execute instructions directing the processor to perform the functions discussed in greater detail below. The control circuitry 518 may also include memory or data storage adapted to contain such instructions. In another implementation, the control circuitry 518 may be strictly hardware-based logic, or may include a combination of hardware, firmware, and/or software elements.

Figure 5:
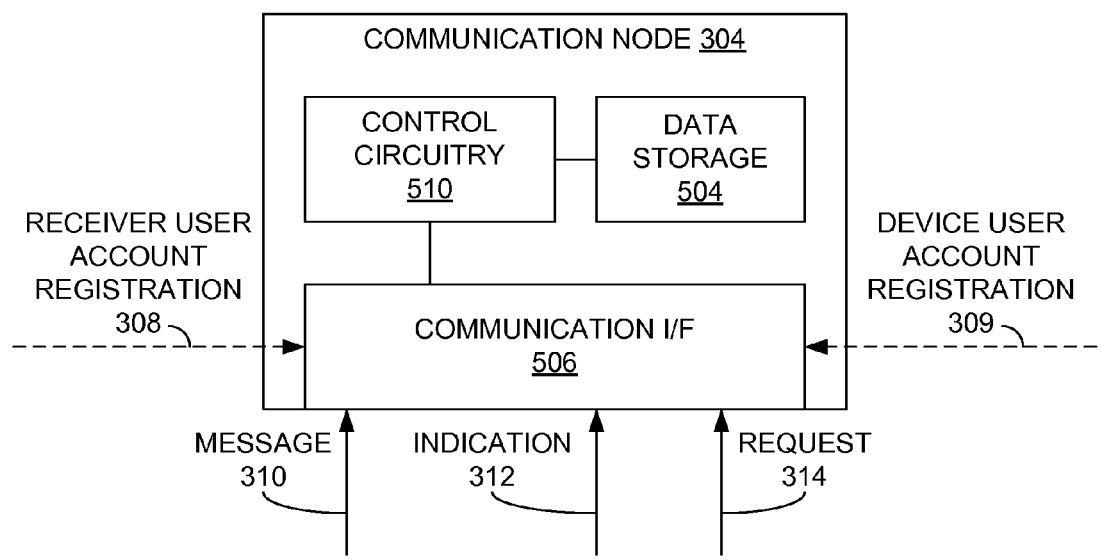
FIG. 5 is a block diagram of a communication node of FIG. 3 according to an embodiment of the invention.

FIG. 5 depicts the communication node 304 of FIG. 3 in one implementation. The communication node 304 may be viewed as a communication server that facilitates the transmitting of the audio/video content 316 from the receiver 302 to the communication device 306 based on data held within the node 204. In FIG. 5, the node 304 includes data storage 504, a communication interface 506, and control circuitry 510, each of which may be similar in construction to the data storage 404, the communication interface 406, and the control circuitry 410 of the receiver 302, respectively, as described above in conjunction with FIG. 4.

In one example, the communication interface 506 exchanges various communications, such as the communications 308-314 noted in FIG. 3, with the receiver 302 and the communication device 306. The data storage 504 stores the data mentioned above to facilitate the connection of the receiver 302 with the communication device 306 to transfer the audio/video content 316 therebetween. The control circuitry 510 controls and communicates with the communication interface 506 and the data storage 504, generates and processes various communications involving the node 304, and maintains the data held in the data storage 504, as is described in greater detail below.

Figure 6:
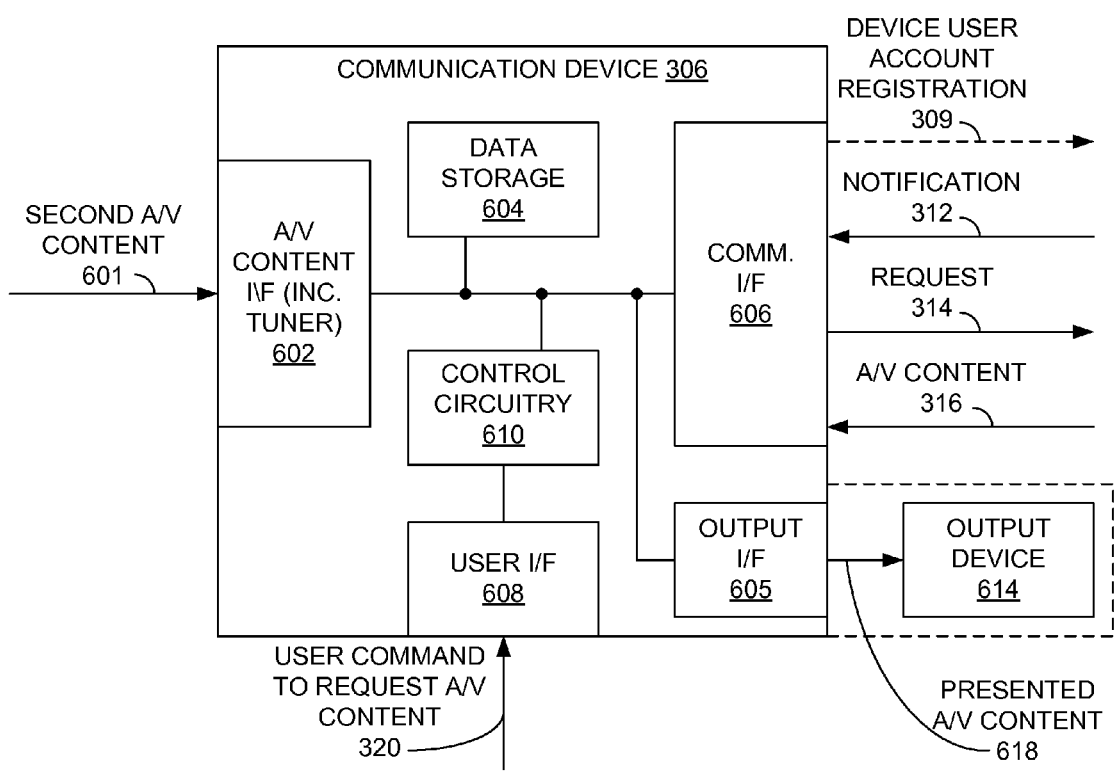
FIG. 6 is a block diagram of a communication device of FIG. 3 according to an embodiment of the invention.

FIG. 6 provides a view of the communication device 306 of FIG. 3 in one implementation. In this case, the communication device 306 includes an output interface 605, a communication interface 606, a user interface 608, and control circuitry 610, similar to the corresponding components described above in connection with the receiver 302 of FIG. 3. Optionally, the communication device 306 may include an audio/video content interface 602 similar to the content interface 402 of the receiver 302, whereby the communication device 306 may receive satellite, cable, or other signals carrying audio/video content 601. Also possibly included in the communication device 306 is data storage 604 for storing the content 601 received via the content interface 602, similar to the data storage 404 of the receiver 302.

As with the output interface 405 of the receiver 302, the output interface 605 of the communication device 306 is configured to decode and/or otherwise process audio/video content 618 to an output device 614, such as a television, video monitor, audio receiver, and the like. In one implementation, the output device 614 may be incorporated within the communication device 306.

Thus, depending on the combination of components included within the communication device 306, the device 306 may acquire any number of identifiable forms. For example, the inclusion of the audio/video content interface 602 may produce an audio/video receiver, such as a cable or satellite television set-top box (similar to the audio/video content receiver 302 of FIG. 3), serving as the communication device 306. The addition of the data storage 404 may further provide DVR functionality for the receiver. Other embodiments in which the content interface 402 is absent may also serve as the communication device 306, such as a laptop or desktop computer system. Further, incorporating the output device 614 within the communication device 306 may be common for mobile communication devices, such as cellular phones, serving as the communication device 306. Many other types of communication devices, such as personal digital assistants (PDAs), capable of communicating by way of the communication interface 606, either in wired or wireless fashion, may by employed as the communication device 306 as described hereinafter.

In operation, the audio/video communication network 300 allows a user of the audio/video content receiver 302 to select specific "remote users", such as the user of the communication device 306, as well as users of other communication devices not shown in FIG. 3, to access audio/video content 316 stored in the data storage 404 of the audio/video content receiver 302. As mentioned above, this ability may be facilitated by data maintained within the data storage 504 of the communication node 304. In one example, the user of the receiver 302 and the user of the communication device 306 (as well as other users) may each provide data to the communication node or server 304 for storage and subsequent processing. Such data may be initially provided as part of a registration process for each of the users. Further, this registration may result in an "account" or other data structure identified with the associated user. This account may include identifying information for the user and any device (such as the receiver 302 or the communication device 306) associated with that user, user preference information, and information associating the account user with other users, termed hereinafter as "friends" of the user associated with the account. The account registration 308 for the user of the receiver 302, as well as the account registration 309 for the user of the registration device 306, are depicted in FIG. 3.

Figure 7:
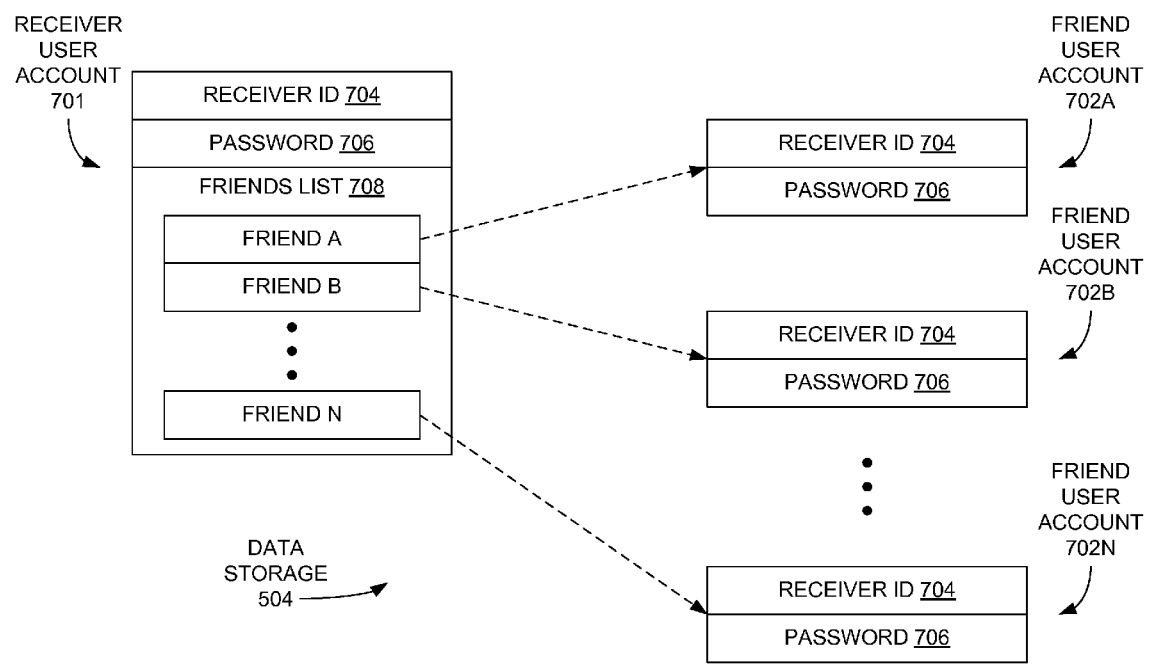
FIG. 7 is a graphical representation of account information stored in the communication node of FIG. 3 in an embodiment of the invention.

FIG. 7 graphically depicts one example of account data for several users as stored in the data storage 504 of the communication node 304. Shown therein is a receiver user account 701 associated with the user or subscriber of the audio/video content receiver 302. In one example, the receiver user account 701 is created when the receiver 302 is initially placed into service, causing the receiver 302 to communicate with the communication node 304 by way of the account registration 308. The receiver account 701 may include a number of data items to be stored in association with the account 701. For example, the receiver 302 may transmit a receiver identifier (ID) 704 uniquely identifying the receiver 302 to the communication node 304 for storing in the receiver account 701. In one implementation, the communication node 304 may associate the receiver ID 704 with a communication network address, such as an IP address, for communicating with the receiver 302. Since such an address may change dynamically, the receiver ID 704 may serve as a stable reference address by which other communication devices, such as the communication device 306 of FIG. 3, may access the receiver 302. In another arrangement, the receiver ID 704 may be the communication network address of the receiver 302.

Another datum that may be stored in the receiver user account 701 is a password 706 that, in conjunction with the receiver ID 704, allows the user of the receiver 302 to engage in remote access to programming stored in the receiver 302 from a computer, cellular phone, or other remote communication device via the communication interface 406 of the receiver 302. In one example, such capability is provided by way of the receiver 302 incorporating Slingbox™ functionality, as set forth above. The user may specify such a password by way of the user interface 408 of the receiver 302.

Further, the receiver user account 701 may include a list 708 of other "remote" users, or "friends" A-N, to whom the user of the receiver 302 may allow access to audio/video content 316 stored in the receiver 302. In one embodiment, each of the friends A-N has their own user account 702A-702N, as shown in FIG. 7, with the communication node generating each of the accounts 702 in response to a registration 309 associated with that user. As with the password 706, such a list 708 may be generated via the user interface 408 of the receiver 302.

As a result of generating the friends list 708, the communication node 304 may then forward to each of the user accounts 702A-702N indicated in the friends list 708 the receiver ID 704 and the password 706 stored in the receiver user account 701. As indicated below, each of the users represented by the user accounts 702A-702N may then access audio/video content 316 stored in the receiver 302 under the permission of the user of the receiver 302. In another example, each of the friend accounts 702A-702N may include a pointer or similar reference to the receiver ID 704 and the password 706 stored in the receiver user account 701.

In another implementation, each of the password 706 and the friends list 708 of the receiver account 702 may be specified by the user of the receiver 302 by way of a device other than the receiver 302. For example, the receiver user account 701 may be accessed by the user of the receiver 302 via an Internet browser employed on a computer, PDA, cellular phone, or other communication device providing access to the Internet. In that case, the communication node 304 may subsequently relay or "push" the resulting information in the receiver user account 701 to the receiver 302. Similarly, each of the friend user accounts 702A-702N may be updated in like manner.

When the user of the audio/video content receiver 302 commands the receiver 302 to record particular audio/video content 316 by way of the user interface 408 of the receiver 302, the user may further indicate a set of "sharing permissions". These permissions indicate which users identified in the friends list 708 are permitted or selected to access the content 316 stored in the receiver 302 for playback on the communication devices 306 associated with those users. In one implementation, the user of the receiver 302 may further specify restrictions under which the selected users may view the content 316. The restrictions may include, but are not limited to, the number of times the selected user may view the content 316, and at which times of the day or week the selected user may access the content 316. Other information, such as textual information provided by the user of the receiver 302, may also be entered in connection with the recording of the content 316. In another arrangement, the user of the receiver 302 may enter the command to record the content 316, along with any permission, restriction, and other information related to the recording, by way of another device, such as a computer or communication device running an Internet browser, accessing the receiver user account 302. In that case, the communication node 304 may relay some or all of the information entered regarding the recording to the receiver 302.

Once the recording of the particular audio/video content 316 at the receiver 302 is complete, the receiver 302 may then transmit a message 310 to the communication node 304 indicating the availability of the content 316 at the receiver 302, the identity of the selected users permitted to access the content 316, and possibly any restrictions or other information entered by the user of the receiver 302 in conjunction with the recording of the content 316.

In response to the message 310, the communication node 304 informs each of the users in the friends list 708 selected for permission to view the recorded content 316 of the availability of the content 316. In one implementation, the communication node 304 indicates this fact in the user account 702 of each user permitted to access the content 316 stored in the receiver 302. Each of these user accounts 702 may also include any restrictions and other related information associated with the content 316. As a result, when a selected user subsequently accesses his or her associated user account 702, such as by way of an Internet browser of the communication device 306, the communication node 304 transmits a notification 312 of the available content 316, possibly along with viewing restrictions and other related information, to the communication device 306. In another example, in which the communication device 306 is configured as a receiver similar to that of the receiver 302, the communication node 304 may push or relay the notification 312 to the device 306 so the user of the device 306 may view the notification 312 without explicitly accessing the user's account 702.

If the user of the communication device 306 decides at some point thereafter to view the content 316 available at the receiver 302, the user may command the device 306 by way of its user interface 608 to issue a request 314 for the recorded content 316 to the communication node 304. In one example, the user issues the request 314 by accessing the user's account 702 by way of an Internet browser resident on the communication device 306 and indicating the request 314 during that access. In another implementation, such as when the communication device 306 is an audio/video content receiver similar to the receiver 302, the user may request the content 316 by way of a graphical user interface or similar means provided by the device 306 without explicitly accessing the user's account 702 on the communication node 304. In turn, the communication device 306 may then issue the request 314 to the communication node 304.

In response to the request 314, the communication node 304 facilitates the communication connection between the receiver 302 and the communication device 306 for transmission of the audio/video content 316. More specifically, the communication node 304 may utilize the receiver ID 704 and the associated password 706 stored in the account 702 of the user issuing the request 314 to locate and gain access to the receiver 302. The communication node 304 may then initiate streaming of the content 316 from the receiver 302 for ultimate delivery to the communication device 306. For example, if the user is accessing the user's account 702 by way of an Internet browser running on the communication device 306, the communication node 304 may receive the content 316 being transmitted from the receiver 302, and forward that content 316 to the communication device 306. In another implementation, such as if the user is employing an audio/video receiver as the communication device 306, the communication node 304 may facilitate a "peer-to-peer" connection between the receiver 302 and the communication device 306 so that the content 316 may be transmitted directly from the receiver 302 to the communication device 306 without routing the content 316 through the node 304. In other examples, the communication node 304 may either receive the content 316 and forward the content 316 to the communication device 306, or facilitate a more direct peer-to-peer connection between the receiver 302 and the device 306, regardless of the nature of the device 306.

In one arrangement, the communication node 304 may enforce any access restrictions regarding when or how often the user of the communication device 306 may receive the audio/video content 316 from the receiver 302, as specified by the user of the receiver 302. In other embodiments, either the receiver 302 or the communication device 306 may provide such restriction enforcement.

Additionally, the transmission of the audio/video content 316 stored in the data storage 404 of the receiver 302 may be subject to any parental controls or other viewing or access control information maintained by the selected user, such as by way of the user's account 702. For example, if the user is employing an Internet browser to access the user's account 702 to request the content 316, the communication node 304 may determine that the content 316 is to be blocked unless the user enters a specific password or code known only to that user. The user may have specified such access control information during a previous access of the user's account 702 by way of the communication device 306 or another communication device. In another example, the communication device 306, such as a receiver similar to the receiver 302 that enforces the access control features, may prevent the receipt of the content 316, or may prevent the initial request 314 by the user, if the user does not enter the specific password or code by way of the user interface 608 of the communication device 306.

In some arrangements, the communication device 306 may be prevented from storing the received audio/video content 316 for playback multiple times by the device 306. Further, the communication device 306 may be prevented from transmitting that content 316 to other communication devices (not shown in FIG. 3). These prevention techniques may be enforced by software employed by the communication device 306 to access the user's account 702 or to receive the content 316 from the receiver 302.

If the content 316 stored in the receiver 302 was made available to the selected users, and the content 316 is subsequently deleted, the receiver 302 may provide an indication to the communication node 304 of the deletion. In response, the communication node 304 may then indicate this fact to the user accounts 702 of the selected users. In the case of the communication device 306 serving as an audio/video content receiver similar to the receiver 302, the communication node 304 may push the indication signifying the deletion of the content 316 to the device 306.

At least some embodiments as described herein facilitate controlled sharing of audio/visual content with only those remote users specifically selected by the initiating user, thus helping prevent widespread distribution of copyrighted or otherwise protected content while retaining the ability to share such content with family, friends, and acquaintances. Further, such sharing is assisted by automated use of identifying information, passwords, and the like to allow a friend to access the receiver storing the content without explicitly specifying that information. Also, the content being shared may be prevented from being subsequently stored on other devices, or from being shared with other users not specified by the user of the receiver storing the content. Additionally, restrictions regarding access to the content may be specified and enforced by the user of the receiver storing the content, the user of the communication device receiving the content, or both.

While several embodiments of the invention have been discussed herein, other implementations encompassed by the scope of the invention are possible. For example, while various embodiments have been described primarily within the context of satellite and cable television broadcast networks, other communication networks not strictly involving the distribution of audio/video programming, such as the Internet and other wide-area networks (WANs), local-area networks (LANs), wired or wireless communication networks, and the like, may benefit from application of the various concepts presented herein. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method of sharing audio/visual content received and stored on an audio/visual content receiver operating within a local network, the method comprising:
   receiving a message from the audio/visual content receiver at a communication node operating as a server on a wide area network, wherein the message is received via the wide area network and wherein the message indicates that the particular audio/visual content has been received and recorded at the audio/visual content receiver;
   at the communication node, notifying the selected user via the wide area network that the particular audio/visual content is available for viewing from the audio/visual content receiver operating within the local network; and
   at the communication node operating on the wide area network, in response to receiving a request from a communication device associated with the selected user for the audio/visual content, facilitating a communication connection over the wide area network between the audio/visual content receiver operating within the local network and the communication device associated with the selected user to thereby allow the audio/visual content to be transmitted by way of a peer-to-peer connection between the audio/visual content receiver and the communication device for presentation to the selected user, wherein the peer-to-peer connection does not include the communication node.

2. The method of claim 1, wherein notifying the selected user of the message comprises:
   at the communication node, sending an indication that the audio/visual content is available for viewing to the communication device associated with the selected user in response to the selected user accessing an online account by way of the communication device.

3. The method of claim 1, wherein notifying the selected user of the message comprises:
   at the communication node, sending an indication that the audio/visual content is available for viewing to the communication device associated with the selected user in response to the communication node receiving the message from the audio/visual content receiver.

4. The method of claim 1, further comprising:
   transmitting an identifier of the selected user from the audio/visual content receiver to the communication node; and
   at the communication node, associating an identifier of the audio/visual content receiver with an account of the selected user located at the communication node;
   wherein facilitating the communication connection is based upon the identifier of the audio/visual content receiver.

5. The method of claim 1, wherein:
   transmitting the audio/visual content from the audio/visual content receiver to the communication device occurs such that the audio/visual content is transmitted through the communication node.

6. The method of claim 1, further comprising:
   at the communication node, filtering the request according to access control information associated with an account of the selected user located at the communication node.

7. The method of claim 1, further comprising:
transmitting an indication of a restriction regarding viewing of the audio/visual content from the audio/visual content receiver to the communication node;
wherein facilitating the communication connection conforms to the restriction.

8. The method of claim 1 further comprising associating the audio/visual content receiver with a network address at the communications node operating on the wide area network, and wherein the facilitating comprises providing the network address associated with the audio/visual content receiver to the communications device to thereby allow the communications device to establish the communication connection with the audio/visual content receiver via the wide area network.

9. The method of claim 8 wherein the network address dynamically changes over time.

10. An audio/visual content receiver, comprising:
an audio/visual content interface configured to receive audio/visual content from an audio/visual content source;
data storage configured to store the audio/visual content;
a communication interface configured to engage in communication on a local area network; and
control circuitry configured to:
transmit a message to a communication node operating as a server on a wide area network by way of the communication interface, wherein the message indicates that the audio/visual content is available for viewing by a selected user;
establish a communications connection over the wide area network with a communication device associated with the selected user, wherein the communication connection is a peer-to-peer connection with the communication device that is facilitated by the communication node on the wide area network but that does not include the communication node;
receive by way of the communication interface a request to transmit the audio/visual content to the communication device via the communication connection; and
transmit the audio/visual content by way of the communication connection to the communication device in response to the request.

11. The audio/visual content receiver of claim 10, further comprising:
a user interface configured to receive a command from a user of the audio/visual content receiver selecting the selected user with which to share the audio/visual content.

12. The audio/visual content receiver of claim 10, wherein:
the audio/visual content interface is configured to receive the audio/visual content by way of a satellite antenna.

13. The audio/visual content receiver of claim 10, wherein:
the audio/visual content interface is configured to receive the audio/visual content by way of a terrestrial antenna.

14. The audio/visual content receiver of claim 10, wherein:
the audio/visual content interface is configured to receive the audio/visual content by way of a coaxial cable.

15. A communication node configured to operate as a server on a wide area network, the communication node comprising:
a communication interface configured to engage in communication with an audio/visual content receiver and a communication device via the wide area network, wherein the audio/visual content receiver operates on a local area network associated with a user and wherein the communication device operates on the wide area network; and
control circuitry configured to:
receive a message from the audio/visual content receiver via the wide area network by way of the communication interface, wherein the message indicates that audio/visual content received at the audio/visual content receiver and stored in the audio/visual content receiver is available for viewing by a selected user, and wherein the selected user is associated with the communication device;
notify the selected user of the message by way of the communication interface and the communication device;
receive by way of the communication interface a request from the communication device to view the audio/visual content; and
in response to the request, by way of the communication interface, facilitate a connection between the audio/visual content receiver and the communications device over the wide area network to thereby allow transmission of the audio/visual content from the audio/visual content receiver operating on the local area network to the communication device, wherein the connection is a peer-to-peer connection between the audio/visual content receiver and the communications device that does not include the communication node.

16. The communication node of claim 15, further comprising:
data storage configured to store an account associated with the selected user;
wherein the control circuitry is configured to notify the selected user of the message by sending an indication that the audio/visual content is available for viewing to the communication device by way of the communication interface in response to the selected user accessing the account by way of the communication interface.

17. The communication node of claim 15, wherein:
the control circuitry is configured to notify the selected user of the message by sending an indication that the audio/visual content is available for viewing to the communication device by way of the communication interface in response to receiving the message from the audio/visual content receiver.

18. A method executable by a server operating as a communication node on a wide area network to facilitate sharing of television content received and stored on a plurality of personal content receivers operating within local area networks, the method comprising:
receiving messages from the each of the plurality of personal content receivers at the communication node via the wide area network, wherein each message indicates particular television content that has been received and recorded at one of the personal content receivers and that is available for viewing by a selected user;
in response to each received message, at the communication node verifying that the selected user is authorized to view the particular television content and, if so, then notifying the selected user via the wide area network that the particular television content is available for viewing from the personal content receiver; and
at the communication node, in response to receiving a subsequent request from a client device associated with the selected user for the particular television content, facilitating a communication connection over the wide area network between the personal content receiver storing the particular television content and the client device to thereby allow the particular television content to be transmitted over the communication connection for presentation to the selected user on the client device, wherein the communication connection is a peer-to-peer connection between the personal content receiver and the client device that does not include the communication node.

19. The method of claim 18 wherein each personal content receiver is accessible on the wide area network using a dynamically-changing network address, and wherein the method further comprises associating each personal content receiver with its dynamically-changing network address, and wherein the facilitating comprises providing the dynamically-changing network address currently associated with the personal content receiver to the client device to thereby allow the client device to establish the communication connection with the personal content receiver via the wide area network.

* * * * *